US006687511B2

(12) United States Patent
McGowan et al.

(10) Patent No.: US 6,687,511 B2
(45) Date of Patent: *Feb. 3, 2004

(54) CDMA TRANSMIT PEAK POWER REDUCTION

(75) Inventors: Neil McGowan, Stittsville (CA); Xin Jin, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 151 days.

This patent is subject to a terminal disclaimer.

(21) Appl. No.: 09/849,338

(22) Filed: May 7, 2001

(65) Prior Publication Data

US 2002/0012403 A1 Jan. 31, 2002

Related U.S. Application Data

(63) Continuation of application No. 09/200,759, filed on Nov. 27, 1998, now Pat. No. 6,236,864.

(51) Int. Cl.[7] .............................. H04B 7/00; H04Q 7/20
(52) U.S. Cl. ..................... 455/522; 455/127.1; 375/296
(58) Field of Search ................................. 375/260, 261, 375/296–298, 146; 370/342, 335, 252; 455/522, 69, 63, 571–572, 126–127, 108, 343, 13.4, 574, 299, 232.1, 127.1, 127.2, 127.4, 114.3, 234.1, 242.1, 242.2; 323/234, 266; 341/139; 330/136, 149

(56) References Cited

U.S. PATENT DOCUMENTS

| 5,199,047 | A | * | 3/1993 | Koch ........................... 375/231 |
| 5,727,026 | A | * | 3/1998 | Beukema ..................... 375/296 |
| 6,047,016 | A | * | 4/2000 | Ramberg et al. ............. 375/200 |
| 6,091,298 | A | * | 7/2000 | McNicol et al. ............. 330/149 |
| 6,178,194 | B1 | * | 1/2001 | Vasic ............................ 375/136 |
| 6,236,864 | B1 | * | 5/2001 | McGowan et al. .......... 455/522 |
| 6,504,862 | B1 | * | 1/2003 | Yang ............................ 375/146 |
| 6,512,417 | B2 | * | 1/2003 | Booth et al. ................. 330/149 |

\* cited by examiner

Primary Examiner—Sinh Tran
Assistant Examiner—Eliseo Ramos-Feliciano (57) ABSTRACT

A peak power regulator is disclosed that functions within a Code Division Multiple Access (CDMA) transmitter to reduce peak power spikes within baseband signals while maintaining the average output power consistent with the average input power, controlling the out-of-band emissions, and maintaining the in-band signal quality within an acceptable degradation. In-phase and quadrature baseband signals are input to a delay block and an envelope magnitude predictor within the peak power regulator. The envelope magnitude predictor outputs an estimate for the magnitude of the envelope that will be generated when the inputted baseband signals are modulated. This estimate is input to a multiplier that generates a ratio by dividing the estimate by a maximum acceptable envelope magnitude. The ratio is subsequently input to a mapping table that outputs a scaling factor sufficient for reducing peak power spikes. The scaling factor is subsequently input to an optional mean power regulator that generates an instantaneous gain value sufficient to maintain the average output power level at the average input power level. This gain value is applied to two multipliers that are also input with delayed versions of the in-phase and quadrature baseband input signals. The outputs from these two multipliers, after being filtered within low-pass filters to remove out-of-band emissions caused by the scaling, are output from the peak power regulator. These peak power reduced outputs have any peak power spikes scale reduced while maintaining the average power constant.

13 Claims, 8 Drawing Sheets

CDMA TRANSMIT PEAK POWER REDUCTION

This applications is a continuation of application Ser. No. 09/200,759 filed Nov. 27, 1998 now U.S. Pat. No. 6,236,864.

FIELD OF THE INVENTION

This invention relates generally to control of power and more specifically to peak power regulation.

BACKGROUND OF THE INVENTION

The use of Code Division Multiple Access (CDMA) technology is increasing within wireless applications such as cellular and Personal Communication Systems (PCS). Its utilization will continue to be significant as CDMA technology is incorporated within new standards such as the third generation (3G) Direct Spreading (DS)-CDMA communication system currently being defined. In CDMA technologies, multiple users and/or multiple data streams of each user, which each transmit information on a different code channel, share the same frequency channel, hereinafter referred to as a carrier. Furthermore, CDMA transmitters may also utilize multiple carriers, and therefore, multiple CDMA carriers share the same power amplifier and other components within a particular transmitter. This sharing of carriers between users and/or the sharing of power amplifiers and other components between carriers cause compounded signals to have a high Peak to Average Power Ratio (PAPR) to be processed by said components. In the 3G DS-CDMA standards, multiple code channels share the same carrier within 3G mobile stations. Hence, similar to that for a base station, compounded signals with potentially high PAPR are input to the power amplifiers of 3G mobile stations.

In order to meet the out-of-band emissions requirements, a power amplifier and other components with this high PAPR input is required to provide good linearity in a large dynamic range. This makes the power amplifier one of the most expensive components within the communication system. The high PAPR also means that the power amplifier operation has low power efficiency. When considering the 3G DS-CDMA case, this low power efficiency reduces the battery life time for 3G mobile stations.

An apparatus is thus needed that can reduce the PAPR of CDMA signals input to power amplifiers. Such a device should reduce the peaks of the compounded input signals such that a less expensive power amplifier can be utilized with out-of-band emissions still being fully controlled. This device should also be relatively inexpensive and any degradation in terms of in-band signal quality should be within an acceptable range.

SUMMARY OF THE INVENTION

It is an object of the present invention to overcome the disadvantages of the prior art and, in particular, to provide an apparatus whereby the Peak to Average Power Ratio (PAPR) within a signal is controlled.

According to a first broad aspect, the present invention provides a peak power regulator, input with at least one input signal, that outputs at least one output signal corresponding to the input signal, the power regulator comprising: a delay apparatus that generates a delayed signal corresponding to the input signal; a power estimation apparatus that generates, with use of the input signal, an overall input power estimation signal corresponding to the input signal; a scaling factor generator that generates a scaling factor with use of the overall input power estimation signal and a maximum acceptable power signal; a power scaling apparatus that utilizes the scaling factor and the delayed signal to generate a scaled signal corresponding to the output signal; and a filtering apparatus that filters the scaled signal to generate the output signal.

According to a second broad aspect, the present invention provides an envelope magnitude regulator, input with at least one IF input signal, that outputs at least one IF output signal corresponding to the IF input signal, the envelope magnitude regulator comprising: a delay apparatus that generates a delayed IF signal corresponding to the IF input signal; an envelope magnitude estimation apparatus that generates, with use of the IF input signal, an overall input envelope magnitude estimation signal corresponding to the IF input signal; a scaling factor generator that generates a scaling factor with use of the overall input envelope magnitude estimation signal and a maximum acceptable envelope magnitude signal; an envelope magnitude scaling apparatus that utilizes the scaling factor and the delayed IF signal to generate a scaled IF signal corresponding to the IF output signal; and a filtering apparatus that filters the scaled IF signal to generate the IF output signal.

According to a third broad aspect, the present invention provides In a peak power regulator, input with at least one input signal, that outputs at least one output signal corresponding to the input signal, a method for regulating output power comprising the steps of: estimating the overall input power level corresponding to the input signal; generating a scaling factor with use of the estimate of the overall input power level and a maximum acceptable input power signal; delaying the input signal; generating a scaled signal corresponding to the output signal with use of the scaling factor and the delayed input signal; and filtering the scaled signal to generate the output signal.

BRIEF DESCRIPTION OF THE DRAWINGS

The invention will now be described with reference to the following figures, in which:

FIG. 4b is an alternative embodiment for the envelope magnitude predictor used in the multi-carrier Baseband PPR block of FIG. 4a;

DETAILED DESCRIPTION OF THE PREFERRED EMBODIMENTS

Although the preferred embodiment of the present invention described herein below is incorporated within a CDMA transmitter, the present invention is not limited to such an implementation, but for example can be utilized in any transmitter in which peak power reduction and control of out-of-band emissions is required.

A single channel CDMA transmitter using a Baseband Peak Power Reduction (PPR) block according to a preferred embodiment of the present invention is now described with reference to FIG. 1. A Data Source (DS) 102 generates data streams 104 for transmission on multiple code channels corresponding to multiple users and/or multiple data streams for each user. These data streams 104 from the DS 102 are encoded, spread, and combined within a Channel Encoder and Spreader (CES) 106 which outputs an in-phase (I) baseband signal 108 and a quadrature (Q) baseband signal 110. The I and Q baseband signals 108,110 are then pulse shaped by a Baseband Pulse Shaping Filter (BPSF) 112 that outputs pulse shaped I and Q baseband signals 114,116 to a Baseband PPR block 118. The output from the Baseband PPR block 118 are peak power reduced baseband signals 120,122 which are subsequently modulated within a Quadrature Modulator (QM) 124. The output signal 126 from the QM 124 is input to an Up-Converter (UC) 128 which shifts the frequency of the signals to the desired transmitting frequency. The up-converted signal 130 output from the UC 128 is input to Power Amplifier (PA) 132. The output signal 134 from the PA 132 is filtered by an RF Filter (RFF) 136 before being transmitted to the air through an antenna 138.

It is well known that the UC 128 may involve multiple stage up-conversion operations. Also, not shown within FIG. 1 is the conversion of the data information signal from digital to analog format. This conversion is preferably done either between the Baseband PPR block 118 and the QM 124 or anywhere between the QM 124 and the final up-conversion stage of the UC 128. In alternative embodiments of the present invention, described in detail herein below with reference to FIGS. 5, 6, and 7, the Baseband PPR block 118 is removed and an Intermediate Frequency (IF) PPR block is included after the QM 124.

Figure 1:
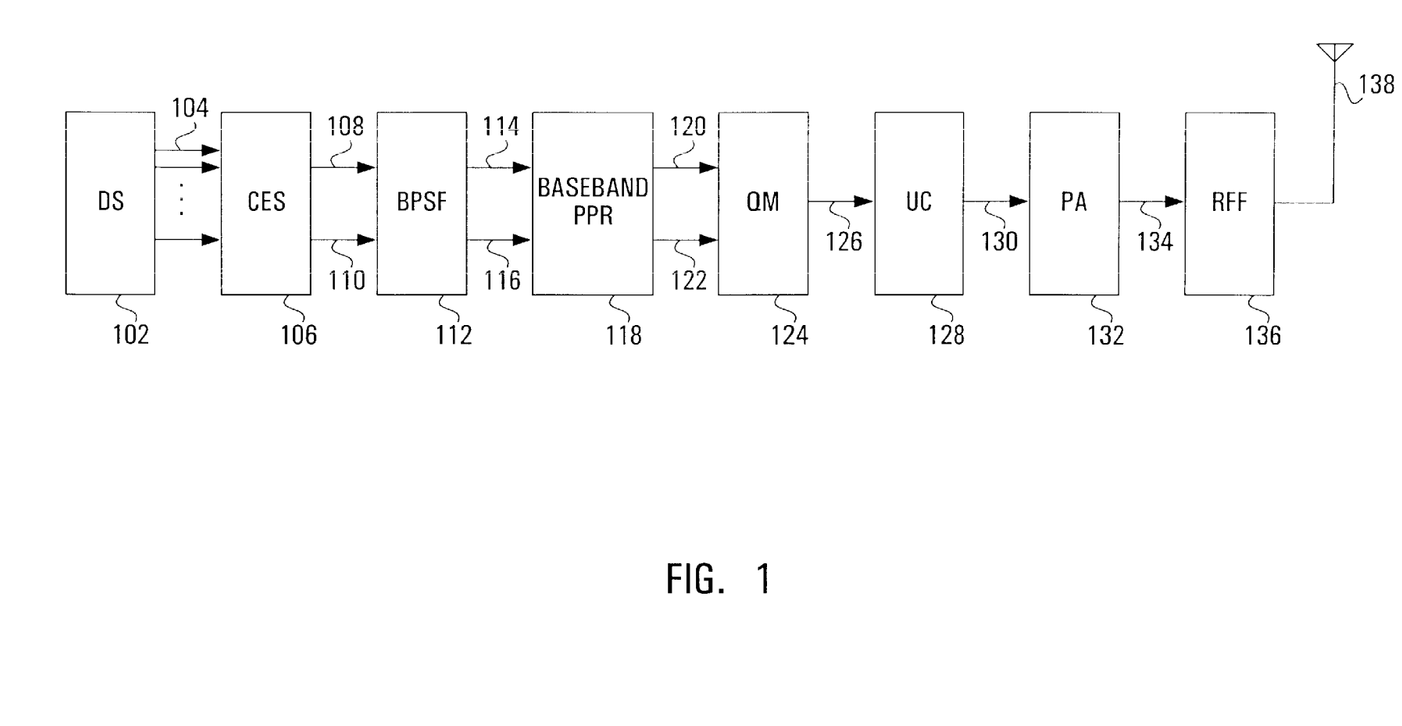
FIG. 1 is a block diagram of a single carrier transmitter according to a preferred embodiment of the present invention.
Figure 2:
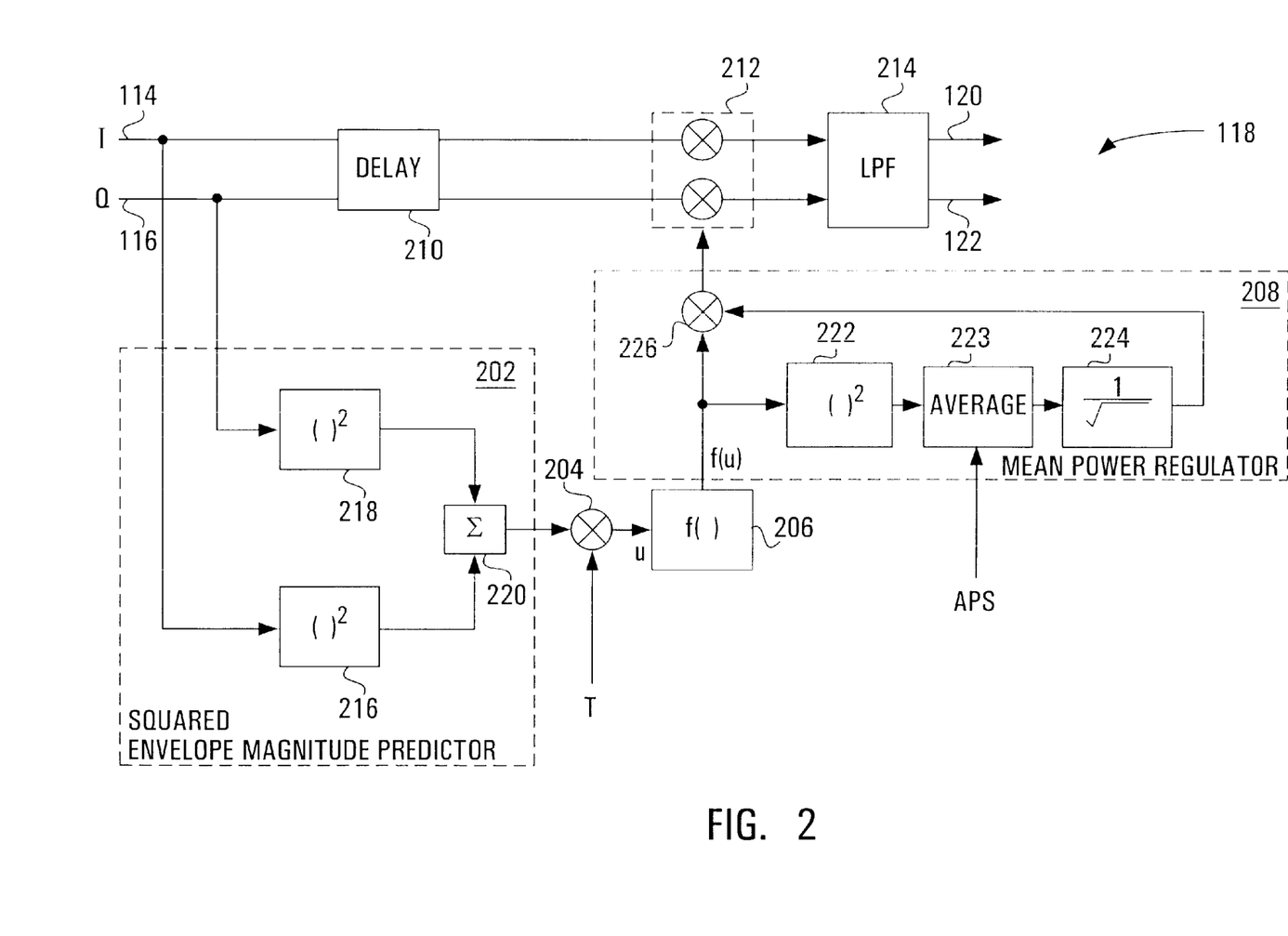
FIG. 2 is a functional block diagram of a single carrier Baseband Peak Power Reduction (PPR) block used in the transmitter of FIG. 1.

FIG. 2 illustrates the preferred embodiment of the Baseband PPR block 118 implemented within the single carrier transmitter depicted in FIG. 1. This Baseband PPR block 118 utilizes nonlinear baseband processing to instantaneously scale the pulse shaped I and Q CDMA baseband signals 114,116 to within an acceptable threshold range. The scaling of the baseband signals results in the envelope of modulated CDMA signals being equivalently scaled to a pre-configured magnitude threshold after quadrature modulation.

The Baseband PPR block 118, depicted within FIG. 2, comprises a squared envelope magnitude predictor 202 input with the I and Q baseband signals 114,116, a multiplier 204 input with the output from the squared envelope magnitude predictor 202 and a configurable threshold signal T, a mapping table 206 input with the output from the multiplier 204, a mean power regulator 208 input with the output of the mapping table 206, a delay block 210 input with the I and Q baseband signals 114,116, multipliers 212 input with the outputs from the delay block 210 and the mean power regulator 208, and a Lowpass Filter (LPF) block 214 input with the outputs from the multipliers 212, that generates the baseband outputs 120,122 to the Baseband PPR block 118 which are subsequently input to the QM 124. The LPF block 214 comprises two LPFs, one for each of the outputs from the multipliers 212.

The squared envelope magnitude predictor 202, which is equivalent to a power estimation apparatus, estimates the squared magnitude of the modulated CDMA waveform envelope that would be formed by the baseband signals 114,116 after quadrature modulation, hereinafter referred to as the squared envelope magnitude, and outputs a signal representative of this squared envelope magnitude. The squared envelope magnitude predictor 202, according to this preferred embodiment of the present invention, comprises a first squarer 216 that multiplies the I baseband signal 114 by itself, a second squarer 218 that multiplies the Q baseband signal 116 by itself, and an adder 220 that sums the outputs of the first and second squarers 216,218. The output from the adder 220 is a squared envelope magnitude corresponding to the baseband signals 114,116.

The multiplier 204 is utilized to establish a scaling threshold. The configurable threshold T is set to be one divided by the maximum acceptable envelope magnitude, as defined by the designer of the communication system, squared. Subsequent to the actual squared envelope magnitude corresponding to the baseband signals 114,116 being produced within the squared envelope magnitude predictor 202 and input to the multiplier 204, the multiplier 204 generates a ratio u of the actual envelope magnitude squared and the maximum acceptable envelope magnitude squared.

This ratio u is input to the mapping table 206 which generates, with use of a mapping function f, a scaling factor by which the gain of the baseband signals 114,116 should be adjusted to ensure that there are no unwanted power peaks. The mapping function f is defined as follows:

$$f(u) = \begin{cases} 1 & u \leq 1 \\ \dfrac{1}{\sqrt{u}} & u > 1 \end{cases}$$

If the ratio u is less than or equal to one, which indicates that the actual envelope magnitude is less than or equal to the maximum acceptable envelope magnitude, a scaling factor f(u) output from the mapping function f is set to one. If the ratio u is greater than one, indicating that the actual envelope magnitude is larger than the maximum acceptable envelope magnitude, the scaling factor f(u), output from the mapping function f, is set to a value sufficient to lower the power corresponding to the baseband signals 114,116 such that the actual envelope magnitude generated after modulation is equal to the maximum acceptable envelope magnitude. In this case, the output from the mapping table 206 is calculated by taking the inversion of the square root of the ratio u, hence the scaling factor f(u) would be equal to the maximum acceptable envelope magnitude divided by the prediction of the actual envelope magnitude. The mapping function f is implemented in the preferred embodiments through use of a look-up table, but in alternative embodiments the function f is implemented with logic circuits.

The mean power regulator 208 is not critical for the operation of the preferred embodiment of the present invention, but is an optional block utilized to maintain a mean output power for the Baseband PPR block 118 consistent with the mean input power, despite the peak power spikes being scaled down. It is included in the preferred embodiment of the present invention depicted in FIG. 2, but is not included within all embodiments of the present invention. The mean power regulator 208 comprises a squaring block 222 coupled in series with an average generator 223 and an inverted square root block 224, with the output of the inverted square root block 224 being input along with the output of the mapping table 206 into a multiplier 226.

The squaring block 222 is input with the scaling factor f(u) generated within the mapping table 206 and generates an output $f^2(u)$ that corresponds to the scaling factor after being multiplied by itself, hereinafter referred to as a Squared Scaling Factor (SSF).

The average generator 223 functions to determine the average SSF generated at the squaring block 222. There are a number of possible implementations for the average generator 223. Within the preferred embodiment of the present invention depicted in FIG. 2, the average generator 223 sums N generated SSFs and subsequently divides the result by N, where N is the period of the average. The designer of the communication system, according to this preferred embodiment, inputs an Average Period Setting (APS) signal to the average generator 223 which determines the value for N. In an exemplary embodiment of this average generator 223, a rotating window of dimension N is utilized that allows a continuous summing and dividing algorithm to proceed. In this algorithm, the newest generated SSF replaces the oldest generated SSF within the rotating window, hence maintaining the dimension of the window at N and ensuring the average SSF estimation is sufficiently accurate. Other embodiments have an average generator 223 implemented with use of various types of LPFs.

The output signal from the average generator 223, representing the average SSF, is input to the inverted square root block 224. The square root block 224 outputs a signal corresponding to a square root of the inverted average of SSFs, hereinafter referred to as the inverted Root Mean Squared (RMS) scaling factors.

The inverted RMS scaling factors generated at the inverted square root block 224 is multiplied in the multiplier 226 with the current scaling factor f(u) output from the mapping table 206 to produce an instantaneous gain value that is input to each of the multipliers 212 in order to scale the baseband signals 114,116. The instantaneous gain value is a ratio between the current scaling factor f(u) and the RMS scaling factor and is used to scale both the I baseband signal 114 and the Q baseband signal 116. The results from the multipliers 212, in this preferred embodiment, have all power peaks reduced and have the average output power consistent with the average input power. Without the use of the mean power regulator 208, the average output power from the Baseband PPR block 118 would be lower than the average input power since the power during periods of power peaks would be reduced without adding additional power during periods of no power peaks. The mean power regulator 208 increases the instantaneous gain value at all times by the average reduction in power over all periods including peak power periods, hence fully compensating for the reduction in average power.

The well understood LPF block 214, coupled to the outputs of the multipliers 212 is used to remove the out-of-band emissions caused by the processing within the Baseband PPR block 118. The delay block 210, coupled between the baseband signals 114,116 and the multipliers 212, is used to delay the baseband signals such that the baseband signals 114,116 are exactly aligned with the instantaneous gain values produced by the multiplier 226.

One skilled in the art would understand that the multiplier 204 combined with the mapping table 206 and possibly combined with the mean power regulator 208 can be seen as a scaling factor generator. As well, it should be understood that the multipliers 212 and the LPF block 214 can be seen as a power scaling apparatus and a filtering apparatus respectively.

Although the description of the single carrier Baseband PPR block 118 depicted within FIG. 2 is consistent with one preferred embodiment, it is recognized that modifications can be made to the implementation. For example, as described previously, the mean power regulator 208 is removed within some alternative embodiments. This results in the average output power from the Baseband PPR block 118 not necessarily being equal to the average input power. As well, a modification could be made in terms of the location of the square root operation within the mapping function f. An additional square root block in one embodiment is included between the adder 220 and the multiplier 204. To adjust for this change, the configurable threshold signal T is redefined as one divided by the maximum acceptable envelope magnitude and the mapping function f within the mapping table 206 is adjusted to the following:

$$f(u) = \begin{cases} 1 & u \leq 1 \\ \dfrac{1}{u} & u > 1 \end{cases}$$

A multi-carrier CDMA transmitter, according to another preferred embodiment, using a Baseband PPR block is now described with reference to FIG. 3. The multi-carrier transmitter is similar to the single carrier transmitter depicted within FIG. 1, but the multi-carrier transmitter includes a plurality of pre-modulation carrier paths. In the example shown in FIG. 3, a transmitter with three carriers is depicted, though this is not meant to limit the scope of the present invention.

Within this transmitter, three DSs 302 generate three separate groups of data streams 304, each allowing transmission on multiple code channels corresponding to multiple users and/or multiple data streams for each user. These data streams 304 are encoded, spread, and combined within three respective CESs 306 which each output respective I and Q baseband signals 308,310. These baseband signals 308,310 are then pulse shaped by three respective BPSFs 312, with all outputs being input to a multi-carrier Baseband PPR block 318, as described in detail herein below with respect to FIG. 4a. Output from the multi-carrier Baseband PPR block 318 are three pairs of peak power reduced I and Q baseband signals 320,322. Subsequently, each pair of baseband signals 320,322 are separately quadrature modulated within three respective QMs 324. The output signals 326 from the QMs 324 are input to a combiner 327 to generate a single compounded IF signal input to an UC 328 which shifts the frequency of the signal to the desired transmitting frequency. The up-converted signal 330 from the UC 328 is subsequently power amplified within a Multi-Carrier Power Amplifier (MCPA) 332, with the output signal 334 from the MCPA 332 being filtered by an RFF 336 before being transmitted to the air through an antenna 338.

It is understood that alternative embodiments of the multi-carrier transmitter, similar to those for the single carrier transmitter of FIG. 1, are possible. As in the single carrier transmitter, the multi-carrier transmitter must have an additional stage for converting the signal from digital to analog format. For easier delay alignment, the preferred embodiment of the multi-carrier transmitter of FIG. 3 has the digital to analog conversion between the combiner 327 and the last up-conversion stage.

Figure 3:
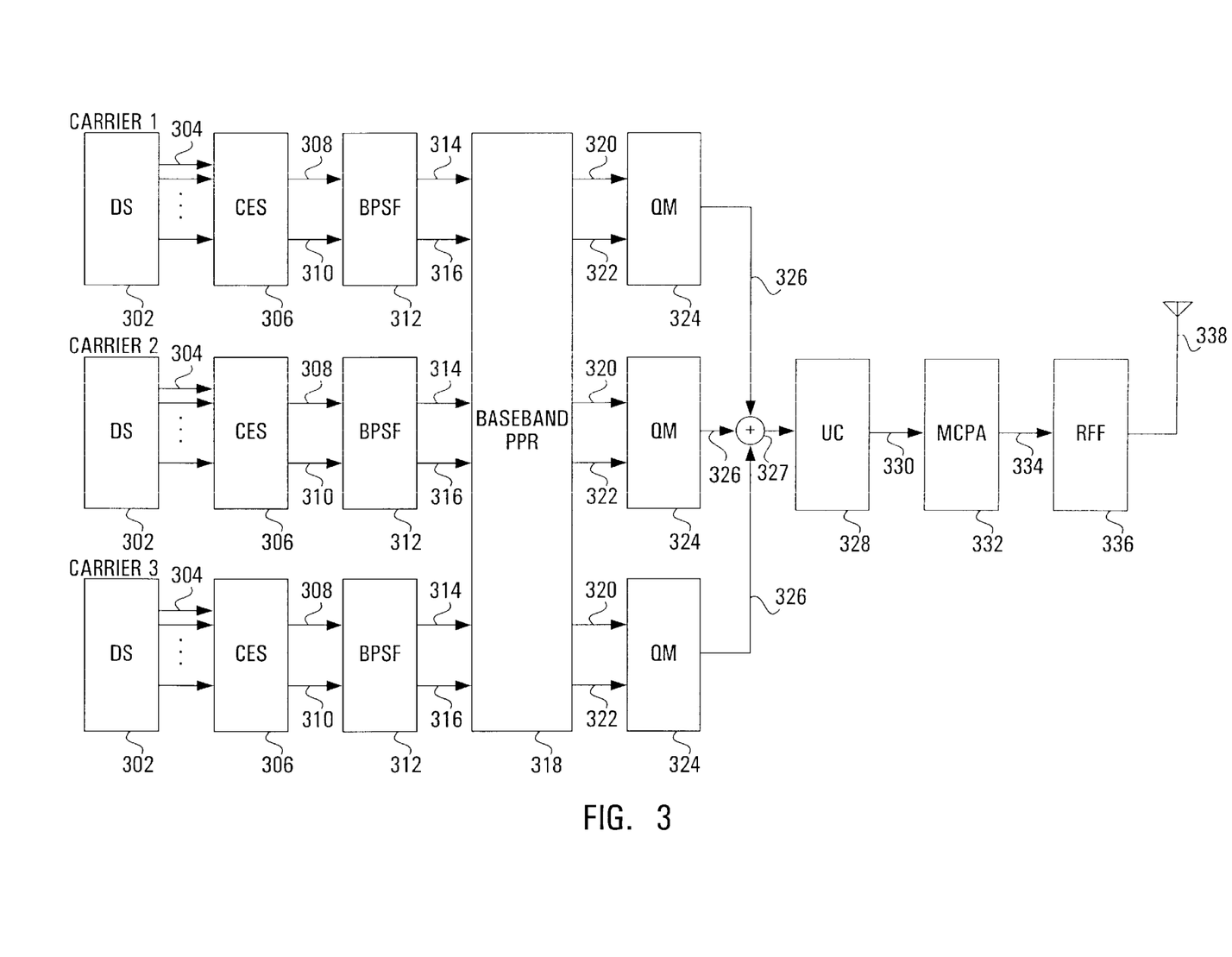
FIG. 3 is a block diagram of a multi-carrier transmitter according to another preferred embodiment of the present invention.

The multi-carrier Baseband PPR block 318 used in the preferred embodiment of the present invention depicted within FIG. 3, is described herein below with reference to FIG. 4a. The overall concept is the same between the single carrier and multi-carrier Baseband PPR blocks 118,318, but the implementation requires modifications. The multi-carrier Baseband PPR block 318 comprises an envelope magnitude predictor 402 coupled in series with a multiplier 404, a mapping table 406, and a mean power regulator 408 within an exemplary embodiment; three delay blocks 410; six multipliers 412; and three LPF blocks 414, each LPF block comprising two LPFs.

The envelope magnitude predictor 402 takes as input the three pairs of baseband signals 314,316 output from the BPSFs 312. Each pair of baseband signals 314,316 is input to a pair of squarers 416,418 with the output of the squarers 416,418 being input to respective adders 419. Each set of squarers 416,418 and adders 419 are equivalent to the squared envelope magnitude predictor 202 depicted within FIG. 2. The envelope magnitude predictor 402, within FIG. 4a, further comprises three square root blocks 420 connected in series with the respective adders 419. The outputs from the square root blocks 420 represent the envelope magnitude corresponding to their respective baseband signals 314,316 if the signals were modulated. These outputs are combined within adder 421 to generate a combined envelope magnitude approximation output from the envelope magnitude predictor 402. This approximation is representative of the worst case magnitude of the envelope generated after all three baseband pairs are quadrature modulated and combined. The magnitude prediction for each pair of baseband signals 314,316 generated with squarers 416,418, adders 419, and square root blocks 420 is a two dimensional estimation while the combination of the three individual envelope magnitude estimations is done linearly, as if the individual two dimensional estimations were lined up in phase perfectly. Hence, the final estimation, generated at the output of the adder 421, is the worst case of the individual baseband envelope magnitudes lining up.

Figure 4A:
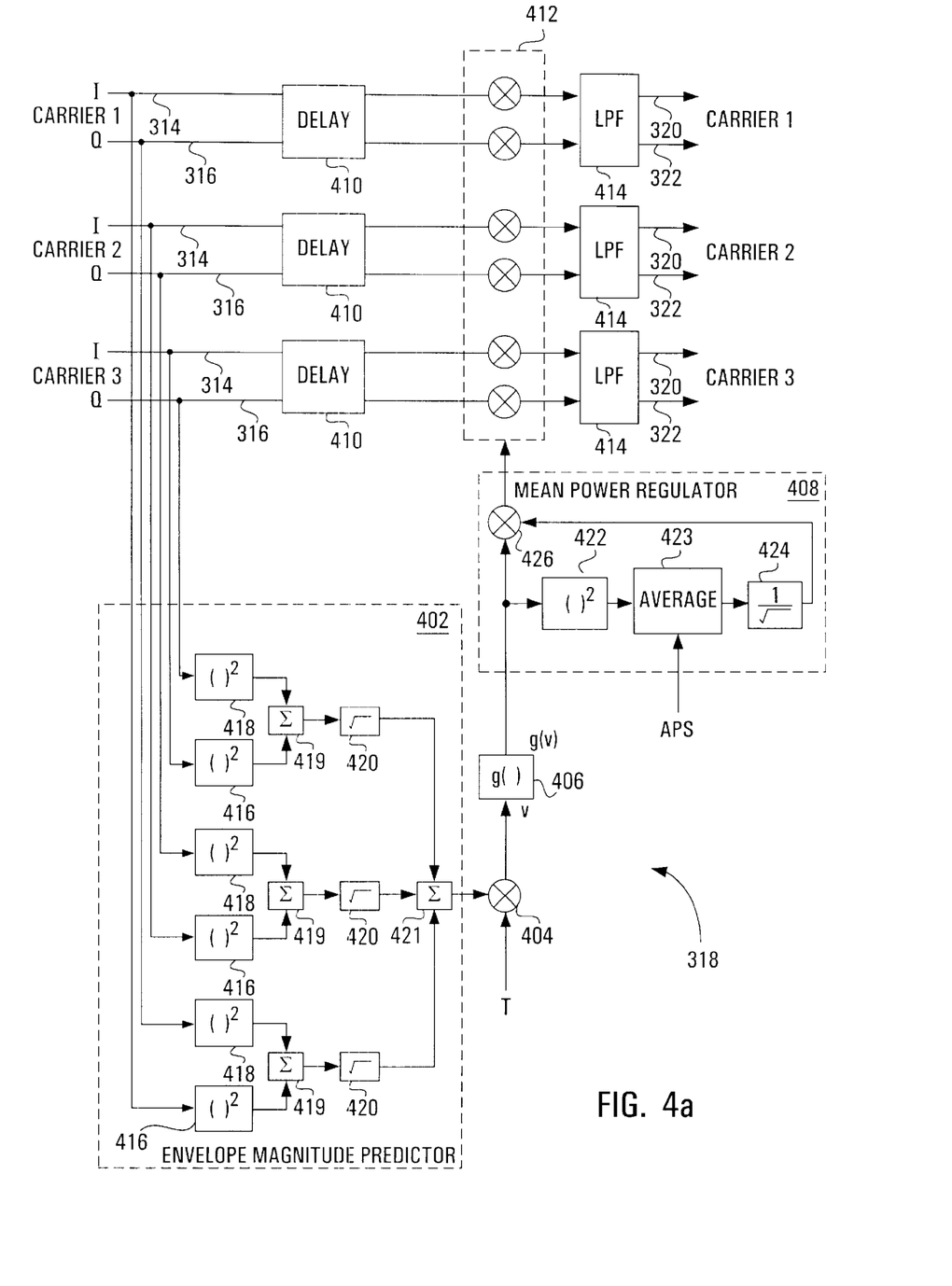
FIG. 4a is a functional block diagram of a multi-carrier Baseband PPR block used in the transmitter of FIG. 3.
Figure 4B:
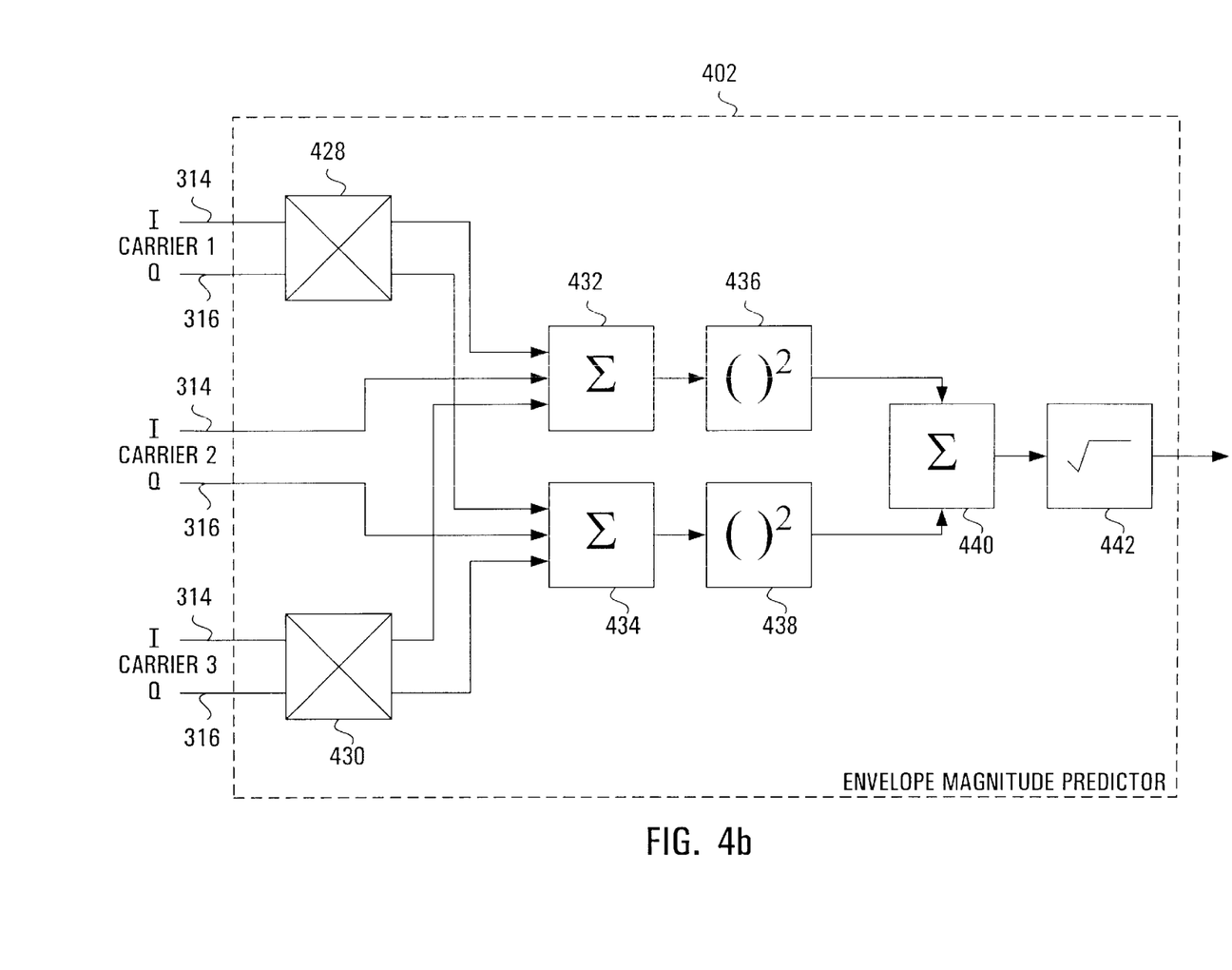

An alternative embodiment for the envelope magnitude predictor 402 is depicted in FIG. 4b. This embodiment accounts for relative frequency and phase information to get an exact envelope magnitude prediction for the combined signal after quadrature modulation. This embodiment requires knowledge from the QMs 324, that being the frequency and phase that will be assigned to each carrier during quadrature modulation.

As shown within FIG. 4b, one pair of baseband signals 314,316 are input to a complex mixer 428, another pair of baseband signals 314,316 are input to a complex mixer 430, and yet another pair of baseband signals 314,316 have the in-phase and quadrature signals input to in-phase and quadrature adders 432,434. In this example with three carriers, the mixers 428,430 shift the frequency and phase of the baseband signals, so that they have the same relative frequency and phase that will occur in their respective QM outputs 326.

The in-phase signals output by complex mixers 428,430 are then input to the in-phase adder 432 and the quadrature signals output by the complex mixers 428,430 are input to the quadrature adder 434. The outputs from the adders 432,434 are input to in-phase and quadrature squarers 436, 438 respectively, with the outputs from the squarers 436,438 being input to an adder 440. The output from the adder 440 is input to a square root block 442 which produces the output to the alternative envelope magnitude predictor of FIG. 4b. The output is an exact prediction of the envelope magnitude that the baseband signals 314,316 would have produced at the output of combiner 327 if they were not scaled by the multi-carrier Baseband PPR block 318. The prediction, in this case, takes into effect the difference in modulating frequency and phase for the different carriers and so is more accurate than that described within FIG. 4a. The disadvantage of the envelope magnitude predictor of FIG. 4b is the increase in complexity.

In other embodiments, with different numbers of carriers, modifications to the envelope magnitude predictor 402 of FIG. 4b can be contemplated. The key in any modification is to maintain the relative frequency and phase between the signals so that the output of the envelope magnitude predictor 402 is an exact prediction of the envelope magnitude that the baseband signals 314,316 would have produced at the output of combiner 327 if they were not scaled by the multi-carrier Baseband PPR block 318. In some alternative embodiments, every pair of baseband signals has a complex mixer associated with it. As well, in some embodiments, the square root block 442 is removed and the square root function is implemented later within the multi-carrier Baseband PPR block 318.

Referring again to FIG. 4a, the output from the envelope magnitude predictor 402 is input to the multiplier 404. Similar to that done for the single carrier PPR block 118 described with reference to FIG. 2, the other input to the multiplier 404 is a configurable threshold signal T. The configurable threshold signal T, within FIG. 4a, is designed to be one over a predetermined maximum acceptable envelope magnitude, such that the output from the multiplier 404 is a ratio v between the actual approximation of the envelope magnitude and the maximum acceptable envelope magnitude.

The mapping table 406 is virtually identical to the mapping table of the single carrier PPR block of FIG. 2, but the square root operation defined within the mapping function f of FIG. 2 has been moved to within the envelope magnitude predictor 402. The mapping table 406 takes as input the ratio v and contains a function g as follows:

$$g(v) = \begin{cases} 1 & v \leq 1 \\ \dfrac{1}{v} & v > 1 \end{cases}$$

Therefore, if the ratio v is less than or equal to one, which would indicate that the approximated envelope magnitude was less than or equal to the maximum acceptable envelope magnitude, a scaling factor g(v) output from the mapping table 406 would be one. If the ratio v was greater than one, representing the case that the approximation is greater than the maximum acceptable envelope magnitude, than the scaling factor g(v) is set to a value sufficient to lower the power corresponding to the baseband signals 114,116 to a power level such that the actual envelope magnitude generated after modulation and combination of the baseband signals 320,322 is equal to the maximum acceptable envelope magnitude. In this case, the output from the mapping table 406 is one divided by the ratio v and this makes the scaling factor g(v), similar to the scaling factor f(u) in FIG. 2, equal to the maximum acceptable envelope magnitude divided by the prediction of the actual envelope magnitude. As well, the mapping table 406 can also be implemented with use of logic circuits with similar outcomes.

The mean power regulator, similar to that described for FIG. 2, is an optional component to the preferred embodiment of the present invention being described with reference to FIG. 4a. Similar to that described for FIG. 2, the scaling factor g(v), output from the mapping table 406, is input to the mean power regulator 408 along with an APS signal. The mean power regulator 408 comprises a squaring block 422, input with the scaling factor g(v), in series with an average generator 423 and an inverted square root block 424, with all three blocks functioning, in the preferred embodiment depicted within FIG. 4a, as described above for the mean power regulator 208 within the single carrier Baseband PPR block 118. The outputs from the inverted square root block 424 correspond to inverted RMS scaling factors. Further within the mean power regulator 408 is a multiplier 426, similar to multiplier 226 within FIG. 2, that is input with the inverted RMS scaling factor from the inverted square root block 424 and the current scaling factor g(u) from the mapping table 406. The multiplier 426 generates an instantaneous gain value, similar to that generated by the multiplier 226 of FIG. 2, input to each of the six multipliers 412.

The multipliers 412 are further input with delayed versions of the baseband signals 314,316 and output three pairs of peak power reduced baseband signals that are each input to an individual LPF block 414. The LPF blocks 414 are designed to remove the out-of-band emissions caused by the processing within the Baseband PPR block 318. The delay blocks 410 generate the delayed baseband signals corresponding to the baseband signals 314,316 that are input to the multipliers 412. As with the delay blocks 210 of FIG. 2, the delay blocks 410 are used to exactly align the baseband signals 314,316 with their respective instantaneous gain values produced by multiplier 426.

The multi-carrier Baseband PPR block 318, depicted on FIG. 4a, may be adapted to handle different numbers of carriers and is not limited to the case of three carriers as illustrated and described herein above. In cases that it is modified to handle only a single carrier, the implementation is slightly different to that described with reference to FIG. 2, but it is noted that either implementation would function properly.

Although the two preferred embodiment of the present invention described herein above are for Baseband PPR blocks implemented prior to the modulation of the information signals, alternative embodiments are possible with the implementation of an Intermediate Frequency (IF) PPR block after the quadrature modulation stage within a transmitter. One embodiment of a multi-carrier transmitter that utilizes such an IF PPR block is now described with reference to FIGS. 5, 6, and 7.

Figure 5:
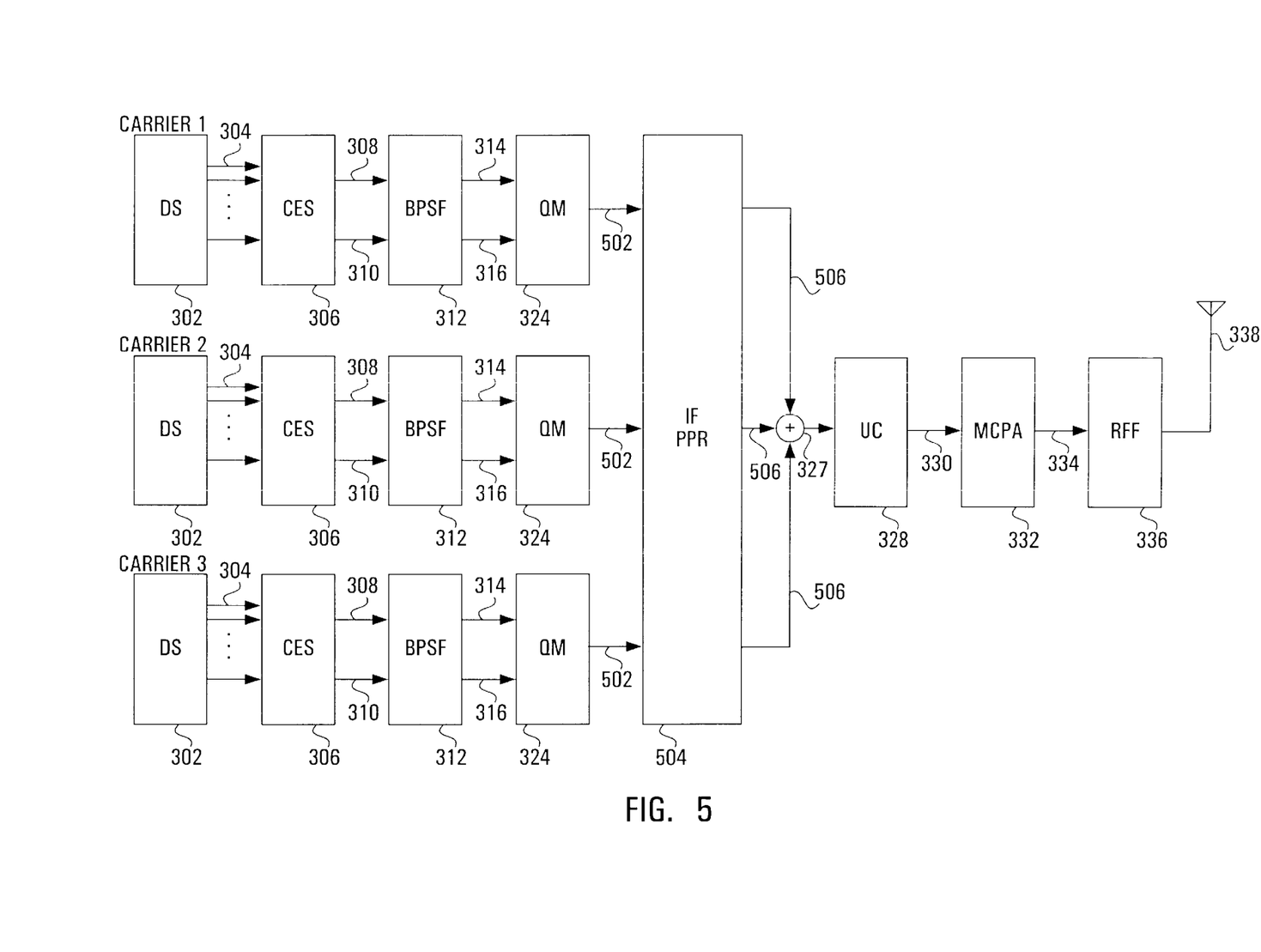
FIG. 5 is a block diagram of a multi-carrier transmitter according to an alternative embodiment of the present invention.

FIG. 5 illustrates a transmitter with three carriers similar to that depicted in FIG. 3, but with the Baseband PPR block 318 removed and an IF PPR block 504, as will be described herein below in detail with reference to FIG. 6, added after the QMs 324. It would be understood by one skilled in the art that the IF PPR block 504 could also be referred to as an envelope magnitude regulator. The change of the PPR blocks modifies the functioning of the transmitter slightly. The pulse shaped baseband signals 314,316, input to the Baseband PPR block 318 in FIG. 3, are now directly input to the QMs 324. Modulated IF outputs 502 from the QMs 324 are input to the IF PPR block 504 with envelope magnitude limited signals 506 subsequently being output to the combiner 327. In the embodiment being described, the remaining components of FIG. 5 are identical to those described with reference to FIG. 3. As in FIGS. 1 and 3, a conversion of the data information signals from digital to analog form is required that is not depicted within FIG. 5. This conversion is preferably done after the IF PPR block 504, but before the final up-conversion stage of the UC 328.

One embodiment of the IF PPR block 504, depicted in FIG. 5, is now described with reference to FIG. 6. This IF PPR block 504 comprises an adder 601, an envelope detector 602, a multiplier 604, a mapping table 606, a mean power regulator 608 within an exemplary embodiment, three delay blocks 610, three multipliers 612, and three Bandpass Filters (BPFs) 614. The adder 601, input with each IF signal 502, outputs a combined IF signal to the envelope detector 602, that will be described in detail with reference to FIG. 7.

The output of the envelope detector 602 is an estimation of the envelope magnitude corresponding to the combination of the IF signals 502 and is input to the multiplier 604 along with a configurable threshold signal T. The configurable threshold signal T is equal to one over a maximum acceptable envelope magnitude. Therefore, the output of the multiplier 604 is a ratio v of the estimated overall envelope magnitude to the maximum acceptable envelope magnitude.

This ratio v is input to the mapping table 606 that is identical to the mapping table 406 within FIG. 4a. This mapping table 606 comprises the mapping function g and outputs a scaling factor g(v) as would be output from the mapping table 406.

Within an exemplary embodiment of this alternative embodiment, the mean power regulator 608 is utilized in similar fashion as described with mean power regulator 408 within FIG. 4a. The mean power regulator 608 comprises squaring block 622 input with the scaling factor g(v), average generator 623 input with the output from the squaring block 622 and an APS signal, an inverted square root block 624 input with the output from the average generator 623, and a multiplier 626 input with the current scaling factor g(v) from the mapping table 606 and the inverted RMS scaling factor output from the inverted square root block 624. All of these components within the mean power regulator 608 operate identically to those within the mean power regulator 408 of FIG. 4a.

The output from the multiplier 626 is an instantaneous gain value that is input to the multipliers 612 in order to scale the modulated IF signals 502. The multipliers 612 are input with delayed versions of the IF signals 502 and output signals that have high envelope magnitudes reduced and average power unchanged. Each output from the multipliers 612 is input to one of the BPFs 614 which subsequently filters the out-of-band emissions generated through the processing within the IF PPR block 504. The delay blocks 610 are utilized, as in FIGS. 2 and 4, to delay the input signals to the IF PPR block 504, in this case the IF signals 502, such that the inputs to the multipliers 612 are exactly aligned with the corresponding instantaneous gain values generated at the multiplier 626.

Figure 6:
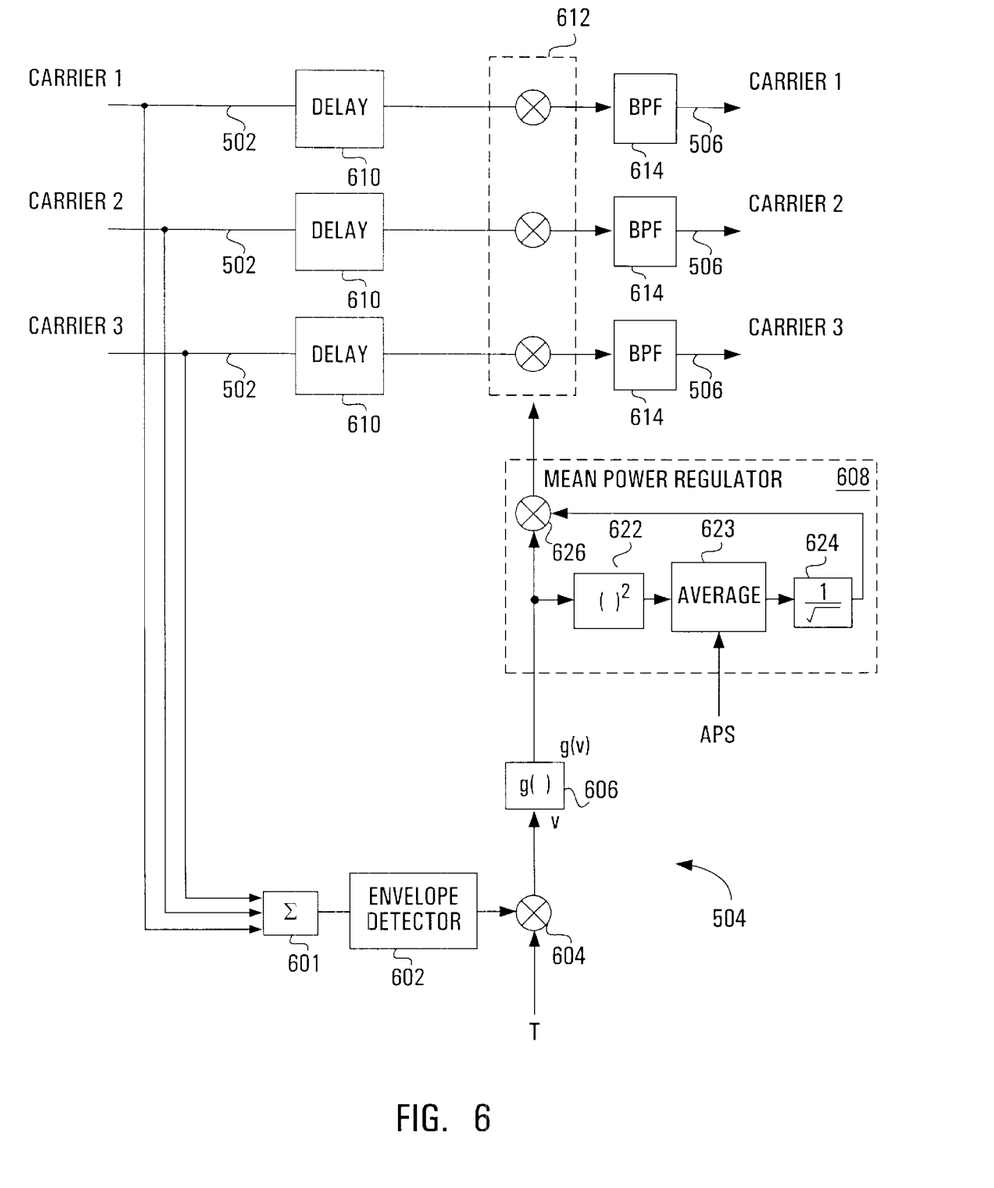
FIG. 6 is a functional block diagram of a multi-carrier Intermediate Frequency (IF) PPR block used in the transmitter of FIG. 5.

It is noted that the alternative implementation depicted in FIGS. 5 and 6 is only one possible implementation of a transmitter utilizing an IF PPR block. Other embodiments are possible that have the IF PPR block anywhere between the QMs 324 and the MCPA 332 with only slight modifications required within the IF PPR block 504. As well, although not shown, a single carrier transmitter utilizing a single carrier IF PPR block is possible by simply scaling FIGS. 5 and 6 to a single carrier with the combiner 327 in FIG. 5 and the combiner 601 in FIG. 6 removed.

There are numerous implementations for the envelope detector 602 within FIG. 6. One sample implementation of the envelope detector 602, now described with reference to FIG. 7, comprises an optional Up-Sampling and Interpolation (USI) block 702 coupled in series with an absolute value block 704 and a Maximum Value Over Time (MVOT) block 706. In a digital implementation, as described in FIG. 6, the optional USI block 702 may be included within the implementation of the envelope detector 602 in order to increase its accuracy. This increase in accuracy is dependent on the sampling rate relative to the carrier frequency.

Figure 7:
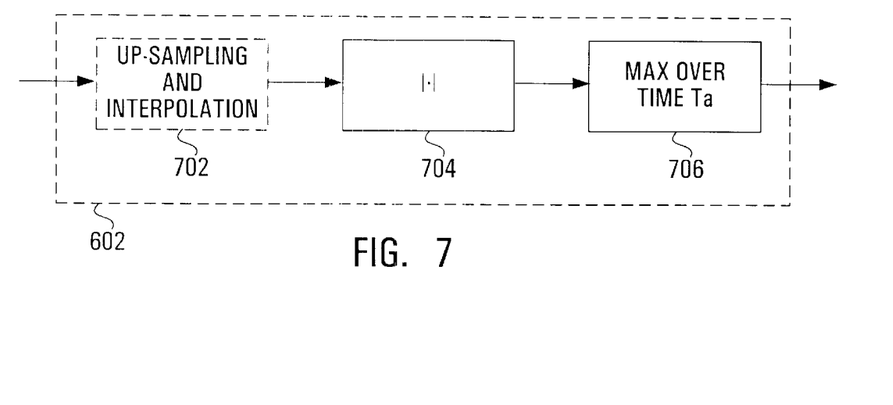
FIG. 7 is a functional block diagram of an envelope detector used in the IF PPR block of FIG. 6.

The absolute value block 704 utilizes a rectifier to take the absolute value of the bipolar IF signal input from the USI block 702. The rectifier, in a digital implementation, is a logic circuit performing the following function:

$$y(x) = \begin{cases} x & x \geq 0 \\ -x & x < 0 \end{cases}$$

where x is in the input and y is the output. The MVOT block 706, is a well understood block which measures the maximum value output from the absolute value block 704 over a predetermined time period Ta. For good accuracy, Ta should be larger than one cycle of the IF signals 502, preferably significantly larger than the sampling rate of the MVOT block 706, and significantly less than 1/W, where W is the signal bandwidth of the signals 502.

One alternative embodiment of the present invention has the PPR block as depicted in one of FIGS. 2, 4, and 6 coupled in series with at least one other PPR block as depicted in the same figure. This coupling of multiple PPR blocks in a cascaded fashion helps to further remove the new peaks rebuilt by the filters within the respective PPR blocks.

Although the different embodiments of the present invention depicted herein above have different implementations for the envelope magnitude predictor, it should be understood that the output signal from the envelope magnitude predictor, hereinafter referred to as the overall input power estimation signal, has the magnitude estimation of the overall input power level incorporated within it. This does not necessarily mean that the overall input power estimation signal is equal to the overall input power estimation level, but that it is possibly a manipulated version of the overall power estimation level using a monotonic function. For example, FIG. 2 depicts a case where the overall input power estimation signal is the estimated overall input power level squared. Similarly, a maximum acceptable power signal incorporates the maximum acceptable power level, previously described as the maximum acceptable envelope magnitude, but does not necessarily mean that the maximum acceptable power signal is equal to the maximum acceptable power level.

Figure 8A:
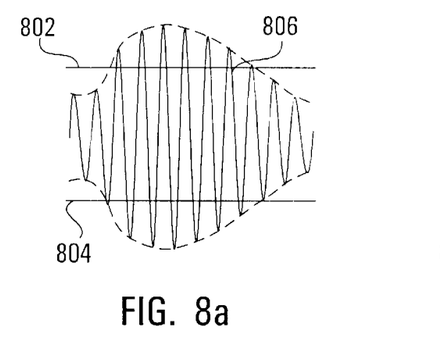
FIGS. 8a, 8b, and 8c are plots illustrating a multi-carrier IF signal, a multi-carrier IF signal after hard limiting, and a multi-carrier IF signal after PPR scaling before filtering respectively.
Figure 8B:
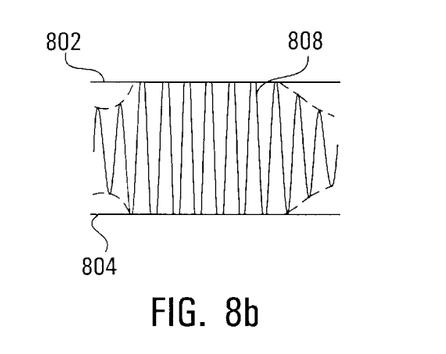
Figure 8C:
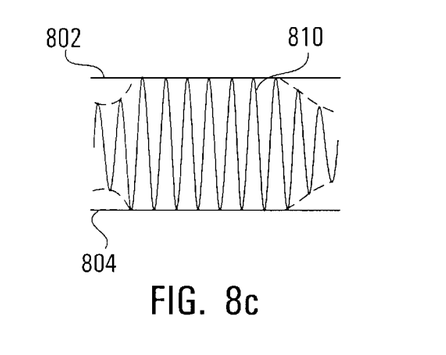

One key advantage of the present invention is the fact that the peak power reductions are done with use of a gain scaler rather than a hard limiter. Differences between a gain scaler and a hard limiter are now described with reference to FIGS. 8a, 8b, and 8c. FIG. 8a illustrates a typical IF signal 806 with an upper and lower limitation line 802,804 applied to the envelope magnitude. FIG. 8b illustrates a hard limited IF signal 808 corresponding to the IF signal 806 that has been limited by the upper and lower limitation lines 802,804. As can be seen from FIG. 8b, the modulated sine wave has its curved peaks cut off, creating flat tops within the curve. FIG. 8c depicts a gain scaled IF signal 810 that has been limited by the upper and lower limitation lines 802,804. Unlike the hard limited signal 808, the gain scaled signal 810 has curved peaks consistent with a sine wave, but simply has the power scaled down during periods of power above and below the respective upper and lower limitation lines 802, 804.

For digital implementations of PPR blocks in which a hard limiter is utilized rather than the scaling implementation of the present invention described previously with reference to FIGS. 1 through 7, the hard limiter would create strong harmonics while limiting the power. These strong harmonics would fall back to the Nyquist band and cause significant distortions. As well, a hard limiter must operate with the combined multi-carrier signals. Thus, after the hard limiter operation, the IF signals cannot be individually filtered resulting in inter-carrier distortions caused by the hard limiter not being removed.

There are numerous advantages gained within the transmitter that utilizes a PPR block according to the present invention. The PPR block scales down the peak power periods while, in the preferred embodiments, maintaining the average power level, therefore reducing the CDMA Peak-to-Average Power Ratio (PAPR). This reduced PAPR is the most significant advantage of the present invention and results in the PA, within the transmitter, being capable of operating at higher average power levels while still satisfying the out-of-band emissions requirements.

Another important advantage of the present invention is the flexibility that this implementation has in terms of supporting various numbers of active carriers. In the three carrier example depicted within FIG. 4a, any of the three carriers can be active or inactive with arbitrary relative transmit power between them.

Depending on the designer's selection of the configurable threshold signal T and the analog power amplifier drive level, the PPR block can be utilized for a number of different purposes. Four different setups for utilizing PPR blocks are now described, these setups are hereinafter referred to as modes A through D.

Within mode A, the average output power of the power amplifier remains constant, with the addition of the PPR block simply reducing the out-of-band emissions while not degrading the in-band waveform quality. In this mode, the PPR block is set using the configurable threshold signal T to clip the information signal no more than the power amplifier would have clipped if the PPR block were not utilized. Only the location of the clipping changes to an earlier stage. Because the LPF(s) within the PPR block removes the out-of-band emissions caused by the PPR scaling and less out-of-band emissions are generated by the power amplifier because of the PPR block, the overall out-of-band emissions are reduced.

Within mode B, the out-of-band emissions are further improved from that of mode A while the same average output power level is used, resulting in a slight degradation of the in-band waveform quality. In this mode, the PPR block clipping depth is increased beyond that originally clipped by the power amplifier without the PPR block. This is done by decreasing the maximum acceptable envelope magnitude as incorporated within the configurable threshold signal T. The combined amount of clipping performed by this setup from the PPR block and the power amplifier is higher than that performed by the power amplifier alone. This reduction in out-of-band emissions is done at a cost within the in-band waveform quality.

Within mode C, the out-of-band emissions are decreased at the same time the average output power from the power amplifier is increased, causing a degradation in the in-band waveform quality to a minimum acceptable level. In this mode, the average output power level is higher than that of mode B, but lower than the power level that results in the out-of-band emissions improvement caused by the addition of the PPR block to be lost. Therefore, both average output power and the out-of-band emissions performance are improved compared to the transmitter implemented without the PPR block while there is an acceptable level of in-band waveform quality degradation.

Within mode D, the average output power for the power amplifier is maximized, while the out-of-band emissions and in-band waveform quality reach their respective worst acceptable limits. In this mode, the configurable threshold signal T and the power amplifier drive level are optimized such that together, the out-of-band emissions reaches its maximum acceptable limit and the in-band waveform quality reaches its minimum acceptable limit, with neither failing. This results in the transmitter implemented with the PPR block reaching the maximum allowable average output power.

Although these four modes are described, one skilled in the art could contemplate other setups for a transmitter with the PPR block of the present invention. The main consideration is the trade off between out-of-band emissions, in-band waveform quality, and average output power.

Persons skilled in the art will appreciate that there are alternative implementations and modifications possible to use an apparatus similar to that described above to reduce peak power periods within data signals, and that the above implementation is only an illustration of this embodiment of the invention. The scope of the invention, therefore, is only to be limited by the claims appended hereto.

What is claimed is:

1. A peak power regulator, input with at least one input signal, that outputs at least one output signal corresponding to the input signal, the power regulator comprising:
   a delay apparatus that generates a delayed signal corresponding to the input signal;
   a power estimation apparatus that generates, with use of the input signal, an overall input power estimation signal corresponding to the input signal;
   a scaling factor generator that generates a scaling factor with use of the overall input power estimation signal and a maximum acceptable power signal;
   a power scaling apparatus that multiplies the delayed signal by the scaling factor to generate a scaled signal corresponding to the output signal; and
   a filtering apparatus that filters the scaled signal to generate the output signal.

2. A peak power regulator, input with at least one input signal, that outputs at least one output signal corresponding to the input signal, the power regulator comprising:
   a delay apparatus that generates a delayed signal corresponding to the input signal;
   a power estimation apparatus that generates, with use of the input signal, an overall input power estimation signal corresponding to the input signal;
   a scaling factor generator that generates a scaling factor with use of the overall input power estimation signal and a maximum acceptable power signal;
   a power scaling apparatus that multiplies the delayed signal by the scaling factor to generate a scaled signal corresponding to the output signal; and
   a filtering apparatus that filters the scaled signal to generate the output signal;
   wherein the scaling factor is equal to one if the scaling factor generator determines the overall input power estimation signal is less than or equal to the maximum acceptable power signal, and wherein the scaling factor is equal to the maximum acceptable power signal divided by the overall input power estimation signal if the scaling factor generator determines the overall input power estimation signal is greater than the maximum acceptable power signal.

3. A peak power regulator, input with at least one input signal, that outputs at least one output signal corresponding to the input signal, the power regulator comprising:
   a delay apparatus that generates a delayed signal corresponding to the input signal;
   a power estimation apparatus that generates, with use of the input signal, an overall input power estimation signal corresponding to the input signal;
   a scaling factor generator that generates a scaling factor with use of the overall input power estimation signal and a maximum acceptable power signal;
   a power scaling apparatus having a multiplier, the multiplier used to multiply the delayed signal by the scaling factor to generate a scaled signal corresponding to the output signal; and
   a filtering apparatus having a lowpass filter, the lowpass filter used to filter the scaled signal to generate the output signal.

4. An envelope magnitude regulator, input with at least one IF input signal, that outputs at least one IF output signal corresponding to the IF input signal, the envelope magnitude regulator comprising:
   a delay apparatus that generates a delayed IF signal corresponding to the IF input signal;
   an envelope magnitude estimation apparatus that generates, with use of the IF input signal, an overall input envelope magnitude estimation signal corresponding to the IF input signal;
   a scaling factor generator that generates a scaling factor with use of the overall input envelope magnitude estimation signal and a maximum acceptable envelope magnitude signal;
   an envelope magnitude scaling apparatus that multiplies the delayed IF signal by the sealing factor to generate a scaled IF signal corresponding to the IF output signal; and
   a filtering apparatus that filters the scaled IF signal to generate the IF output signal.

5. A CDMA transmitter comprising:
   a data source coupled in series with a channel encoder and spreader, a baseband pulse shaping filter, and a quadrature modulators;
   an envelope magnitude regulator according to claim 4 input with the output from the quadrature modulator, the output from the quadrature modulator corresponding to the IF input signal; and
   an up-converter, input with the IF output signal, coupled in series with a power amplifier, a radio frequency filter, and an antenna.

6. A CDMA transmitter comprising:
   a plurality of data sources coupled in series with a plurality of channel encoder and spreaders, a plurality of baseband pulse shaping filters, and a plurality of quadrature modulators;
   a combiner, that combines the outputs from the quadrature modulators;
   an envelope magnitude regulator according to claim 4 input with the output from the combiner, the output from the combiner corresponding to the IF input signal; and
   an up-converter, input with the IF output signal, coupled in series with a multi-carrier power amplifier, a radio frequency filter, and an antenna.

7. In a peak power regulator, input with at least one input signal, that outputs at least one output signal corresponding to the input signal, a method for regulating output power comprising the steps of:
   estimating the overall input power level corresponding to the input signal;

generating a scaling factor with use of the estimate of the overall input power level and a maximum acceptable input power signal;

delaying the input signal;

generating a scaled signal corresponding to the output signal with use of the scaling factor and the delayed input signal; and filtering the scaled signal to generate the output signal.

8. A peak power regulator, input with at least one input signal, that outputs at least one output signal corresponding to the input signal, the power regulator comprising:

a delay apparatus that generates a delayed signal corresponding to the input signal;

a power estimation apparatus that generates an instantaneous power estimate of the input signal;

a scaling factor generator that generates a scaling factor with use of the instantaneous power estimate and a maximum acceptable power signal;

a power scaling apparatus that multiplies the scaling factor and the delayed signal to generate a scaled signal; and a filtering apparatus that filters the scaled signal to generate the output signal.

9. A peak power regulator according to claim 8, wherein the scaling factor is equal to one if the scaling factor generator determines the instantaneous power estimate is less than or equal to the maximum acceptable power signal; and wherein the scaling factor is equal to the maximum acceptable power signal divided by the instantaneous power estimate if the scaling factor generator determines the instantaneous power estimate is greater than the maximum acceptable power signal.

10. A peak power regulator according to claim 8, wherein the power scaling apparatus comprises a multiplier used to multiply the delayed signal by the scaling factor to generate the scaled signal and the filtering apparatus comprises a lowpass filter used to filter the scaled signal, the output from the lowpass filter corresponding to the output signal.

11. An envelope magnitude regulator, input with at least one IF input signal, that outputs at least one IF output signal corresponding to the IF input signal, the envelope magnitude regulator comprising:

a delay apparatus that generates a delayed IF signal corresponding to the IF input signal;

an envelope magnitude estimation apparatus that generates an instantaneous envelope magnitude estimate of the IF input signal;

a scaling factor generator that generates a scaling factor with use of the instantaneous envelope magnitude estimate and a maximum acceptable envelope magnitude signal;

an envelope magnitude scaling apparatus that multiplies the scaling factor and the delayed IF signal to generate a scaled IF signal; and a filtering apparatus that filters the scaled IF signal to generate the IF output signal.

12. A CDMA transmitter comprising:

a data source coupled in series with a channel encoder and spreader, a baseband pulse shaping filter, and a quadrature modulator;

an envelope magnitude regulator according to claim 11 input with the output from the quadrature modulator, the output from the quadrature modulator being the IF input signal; and an up-converter, input with the IF output signal, coupled in series with a power amplifier, a radio frequency filter, and an antenna.

13. A CDMA transmitter comprising:

a plurality of data sources coupled in series with a plurality of channel encoder and spreaders, a plurality of baseband pulse shaping filters, and a plurality of quadrature modulators;

a combiner, that combines the outputs from the quadrature modulators;

an envelope magnitude regulator according to claim 11 input with the output from the combiner, the output from the combiner being the IF input signal; and an up-converter, input with the IF output signal, coupled in series with a multi-carrier power amplifier, a radio frequency filter, and an antenna.

* * * * *

UNITED STATES PATENT AND TRADEMARK OFFICE
CERTIFICATE OF CORRECTION

PATENT NO. : 6,687,511 B2
DATED : February 3, 2004
INVENTOR(S) : Neil McGowan et al.

It is certified that error appears in the above-identified patent and that said Letters Patent is hereby corrected as shown below:

Column 14,
Line 31, "...signal by the sealing..." should read -- ...signal by the scaling... --.

Signed and Sealed this

Second Day of November, 2004

JON W. DUDAS
*Director of the United States Patent and Trademark Office*